March 22, 1966 D. L. WALKER ETAL 3,242,480

COMBINATION OF N OF M TONES CODE GENERATOR

Filed July 3, 1963 2 Sheets-Sheet 1

INVENTORS
Donald L. Walker
Theodore Saltzberg
BY Mueller & Aichele
Attys.

March 22, 1966 D. L. WALKER ETAL 3,242,480

COMBINATION OF N OF M TONES CODE GENERATOR

Filed July 3, 1963 2 Sheets-Sheet 2

INVENTORS
Donald L. Walker
Theodore Saltzberg

BY Mueller & Aichele
Attys.

United States Patent Office 3,242,480

Patented Mar. 22, 1966

3,242,480
COMBINATION OF N OF M TONES CODE GENERATOR

Donald L. Walker, Addison, and Theodore Saltzberg, Chicago, Ill., assignors to Motorola, Inc., Franklin Park, Ill., a corporation of Illinois Filed July 3, 1963, Ser. No. 292,585
7 Claims. (Cl. 340—351)

This invention relates to a system for selecting a combination of elements, and in particular to the selection of all the possible combinations of a particular number of elements from a group of elements larger than the particular number.

In communications and control applications such as the sequential monitoring of a large number of devices, it is desirable to be able to select combinations of elements from a larger number of elements. Each different combination identifies a particular device and the device reacts only to that combination. An example of this is the monitoring of a large number of remote alarm devices. Tones may be used in groups to identify the particular devices. These tones can be selected from a larger group of tones which are generated by the system. For example the system may generate nine different tones and each of the groups may consist of three tones. In this case it would be desirable to select, in sequence, different combinations of three tones from the group of nine tones to thereby identify the different alarm devices in sequence. The number of combinations of three tones selected would be equal to the number of alarm devices until all possible combinations of three tones selected from the group of nine tones have been used.

It is therefore an object of this invention to provide a simple system for selecting all the possible combinations of N elements from M elements, where N and M are integers and M is greater than N.

Another object of this invention is to use the combination of elements selected in a desired application for a predetermined period of time after which another and different combination of elements is selected, until all the possible combinations of elements have been selected.

A feature of this invention is the use of a binary counter having M registers to select desired combinations of elements from a group comprised of M elements.

Another feature of this invention is the use of means to stop the binary counter when N and only N of its registers are in a predetermined state after the desired action is accomplished the counter is caused to continue whereupon the output of these registers are used to select all combinations of N elements from M possible elements.

This invention is illustrated in the drawings wherein.

In practicing this invention clock pulses are applied to a binary counter causing it to count through its entire sequence of numbers. The clock input is controlled by a gate which is in turn controlled by circuit means which will recognize when the binary counter registers have a predetermined number of 1's in the registers, and no more than this predetermined number. When this predetermined condition occurs the supply of clock pulses to the counter is interrupted and the output of the registers which are in the desired state are applied to additional circuit means to select the desired elements. The elements selected are used for a predetermined period of time after which pulses are again applied to the counter to cause it to count until its registers again have a predetermined number of 1's and no more than this predetermined number. By allowing the counter to count through its entire sequence of numbers from zero to $2^M-1$, every possible combination of N elements will be developed.

If it is not desired that every possible combination of N elements be selected, the binary counter can be automatically inhibited from counting further than a number P less than $2^M-1$. Thus all the combinations of N elements between P and $2^M-1$ will be omitted. The counter can be inhibited by methods well known in the art.

Figure 1:
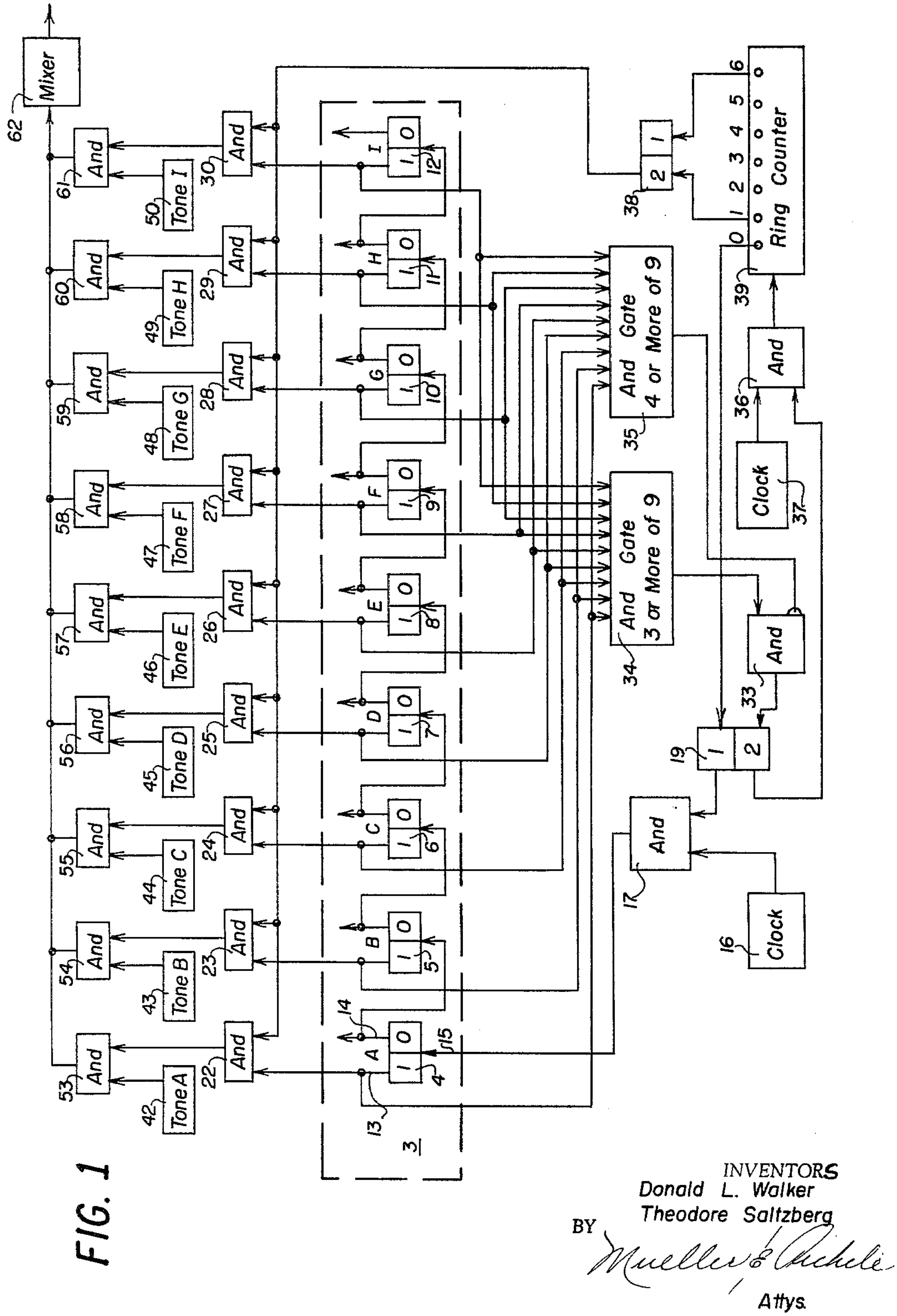
FIG. 1 is a block diagram illustrating the operation of the invention.

FIG. 1 shows a block diagram of the system of this invention in which all possible combinations of three tones are selected from a group of nine tones. The counter 3 is a standard binary counter having nine registers each capable of assuming either the 0 state or the 1 state. The registers are numbered from four through twelve.

Referring to register 4, the output signal developed when the register is in the 0 state is applied to line 14 and the output when the register is in the 1 state is applied to line 13. The input to the register is applied through line 15 and acts upon the register to shift it to the opposite state, that is, if the register is in the 0 state a signal applied to line 15 will change it to the 1 state and if the register is in the 1 state a signal applied to line 15 will shift it to the 0 state.

The outputs of the 0 state of registers 4 through 11 are coupled to the inputs of each of the subsequent registers. Since register 12 is the last register in the chain the output of its 0 state is not used. The input to register 4 is applied over line 15.

Assuming all the registers are initially in the 0 state a signal applied to register 4 on line 15 will cause this register to shift to the 1 state. A subsequent signal applied to this register through line 15 will cause it to shift to the 0 state and at the same time develop a signal which is applied to register 5 causing register 5 to shift to its 1 state. A third pulse applied to line 15 will cause register 4 to again shift to the 1 state representing three input signals or the binary equivalent of the decimal number 3. A fourth signal on line 15 will cause register 4 to return to the 0 state developing a signal which is applied to register 5. This register also returns to its 0 state and develops a signal which is applied to register 6 causing this register to assume the 1 state. This represents four input signals on line 15 and the registers indicate the number one-zero-zero which is the binary equivalent of the decimal number 4. This action continues until the counter reaches the binary number 111111111. When the binary counter reaches this number an input signal applied over line 15 will cause all the registers to assume the 0 state.

The input signals which cause the binary counter to count through its states are applied from the clock 16 through AND gate 17. An enabling signal for AND gate 17 is applied from the output of the first stable state of bistable multivibrator 19. Bistable multivibrator 19 is normally in its first stable state.

The outputs of the registers when they are in the 1 state are applied to AND gates 22–30. As stated before the outputs of each of the registers, when they are in the 0 state, are applied to the subsequent register in the chain. However, the outputs of each of the registers may be applied to other desired portions of the circuitry and are not limited to this application alone.

The output of each of the registers, when they are in the 1 state, is applied to AND gates 34 and 35. AND gate 34 develops an output signal when three or more of the nine registers are in the 1 state while AND gate 35 develops output signals when four or more of the nine registers are in the 1 state. The operation of these AND gates will be described in a subsequent portion of the specification.

The outputs of AND gates 34 and 35 are applied to AND gate 33. A signal applied to AND gate 33 from AND gate 34 develops an output signal from AND gate 33 while a signal applied to AND gate 33 from AND gate 35 inhibits the output signal from AND gate 33. Thus AND gate 33 will develop an output signal only when there is an input signal from AND gate 34 and there is no input signal from AND gate 35. The output signal from AND gate 33 is applied to the bistable multivibrator 19 and causes this multivibrator to shift to its second stable state. When multivibrator 19 is in its second stable state the enabling pulse applied to AND gate 17 is removed and the registers of binary counter 3 will remain in their existing states.

An enabling pulse is applied to AND gate 36 from multivibrator 19 when it is in its second stable state. The other input to AND gate 36 is the clock pulses from clock 37. When AND gate 36 is enabled by an output signal from the bistable multivibrator 19 clock pulses are applied to ring counter 39 from clock 37. Counter 39 is normally in its zero state and counts through six states and returns to zero in the ring counter used in this example. When the ring counter is shifted to its first state a signal is applied to bistable multivibrator 38 causing this multivibrator to change to its second stable state. An output signal is applied from multivibrator 38 to the AND gates 22 through 30. The other input to these AND gates are the signals from the registers which are in the 1 state. Since only three of the registers are in the 1 state three and only three of the AND gates 22–30 will have output signals. These output signals are applied to the AND gates 53 through 61. The other inputs to these AND gates are tones from the tone oscillators 42 through 50. Each of the tone oscillators applies a continuous tone to its AND gate. The three AND gates of the group 53 through 61 which have enabling signals from the AND gates 22 through 30 will develop output tones which are applied to mixer 62. Thus, when ring counter 39 assumes its first state a combination of three tones is developed in mixer 62.

These three tones will be developed in mixer 62 until ring counter 39 reaches it fifth state at which time a signal is applied to the bistable multivibrator 38 returning this multivibrator to its first stable state. This action disables the AND gates 22 through 30 and thus removes the tones from the mixer 62.

When ring counter 39 reaches its zero state, a signal is applied to the bistable multivibrator 19 which returns this multivibrator to its first stable state. The input signal from the multivibrator 19 to AND gate 36 is removed causing ring counter 39 to remain in the zero state. The output of the first stable state of bistable multivibrator 19 is applied to AND gate 17 allowing the clock pulses from clock 16 to reach binary counter 3 causing it to resume its counting action. The binary counter will continue to count until it again reaches a condition where three and only three of its registers are in the 1 state at which time the sequence of operation will be repeated.

Figure 2:
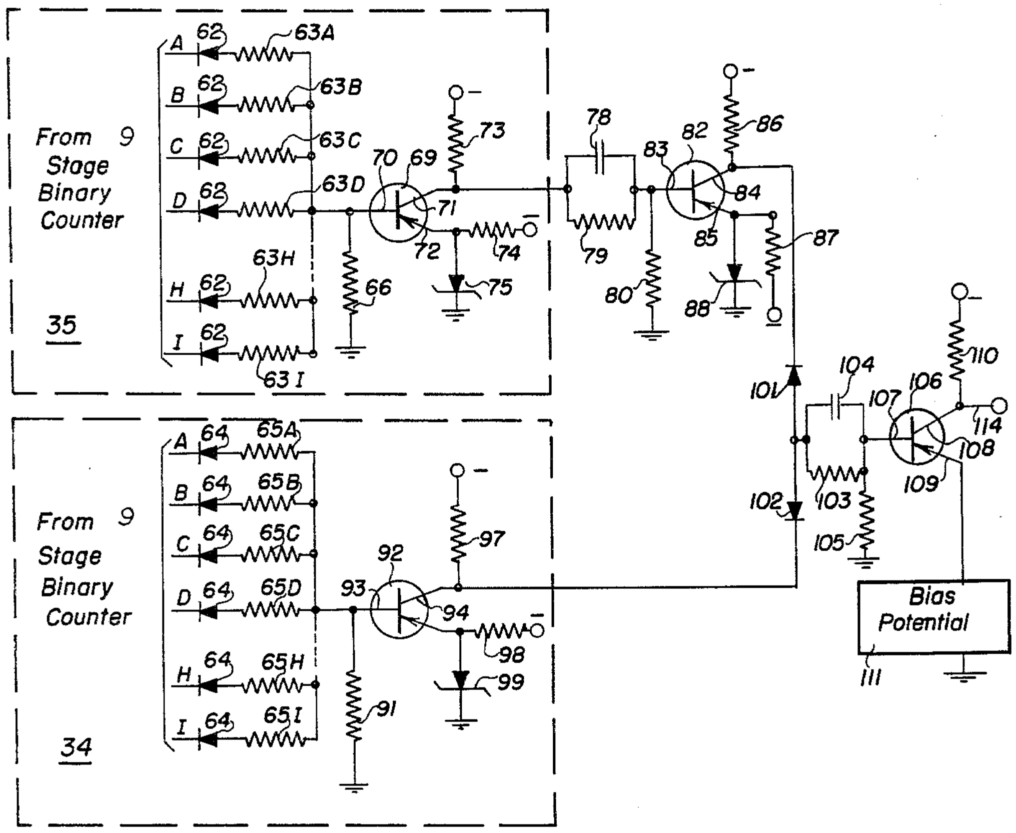
FIG. 2 is a schematic diagram illustrating the operation of AND gates 33, 34, and 35 of FIG. 1.

FIG. 2 is a schematic showing in detail AND gates 33, 34 and 35 of FIG. 1.

The operation of the three or more of nine AND gate 34 and the four or more of nine AND gate 35 is identical and the values of the components used in the two circuits can be the same with the exception of resistors 66 and 91. The values of these resistors determine the number of inputs required for the AND gate to develop an output.

Resistors 63A to 63I and 66 constitute a voltage divider network which determines the voltage applied to the base 70 of transistor 69. Each of the registers of the counter 3 are coupled to AND gates 34 and 35 through isolating diodes 62 and 64. When a register is in its 0 state a zero voltage is applied to the input of AND gates 34 and 35 to which it is connected. When a register is in its 1 state a minus voltage is applied to that input. Thus the voltage developed on the base 70 of transistor 69 when register A is the only register in the 1 state will be determined by the voltage divider comprised of resistors 63A and 66. When two of the registers, for example registers A and B, are in the 1 state the voltage on the base 70 will be determined by the voltage divider comprised of resistors 63A and 63B in parallel, in series with resistor 66. As the number of registers which are in the 1 state increases the voltage applied to the base 70 will decrease in steps. The emitter 72 of transistor 69 is biased at a constant voltage by means of resistor 74 and zener diode 75 connected between a negative supply voltage and ground. By proper selection of the bias voltage applied to the emitter electrode 72 and the value of resistor 66 transistor 69 can be biased to conduction when a predetermined number or registers of counter 3 are in the 1 state. The resistors 66 and 74 and the value of zener diode 75 have been chosen so that the transistor 69 of AND gate 35 will conduct when four or more of the registers of counter 3 are in the 1 state. AND gate 34, is similar in construction to AND gate 35. Resistors 65A to 65I have the same purpose as resistors 63A to 63I and can have the same value. Resistor 98 and zener diode 99 connected between a negative supply voltage and ground furnish a bias potential for the emitter 95 of transistor 92. Resistor 91 is chosen so the bias voltage applied to the base 93 of transistor 92 will be sufficient to bias the transistor to conduction when three or more of the inputs to AND gate 34 have minus voltages applied, that is when three or more of the registers of counter 3 are in the 1 state.

When the transistors 69 and 92 are not conducting the output of AND gates 34 and 35 are a minus voltage equal to the supply voltage. When these transistors conduct resistors 73 and 97 cause the output voltage of AND gates 35 and 34 to rise due to the voltage drop across the resistor. The output of AND gate 34, with all of the registers of counter 3 in the 0 state is a minus voltage and is applied through diode 102 and the network comprised of resistors 103 and 105, and capacitor 104 to the base 107 of transistor 106. Resistors 103 and 105 form a voltage divider network to divide down the voltage from AND gates 34 and 35 applied to transistor 106. A bias potential is supplied to the emitter from a bias supply 111 to provide for temperature stabilization of the circuit. The minus voltage applied to the base 107 from AND gate 34 is sufficient to cause transistor 106 to conduct. When transistor 106 conducts the voltage at terminal 114 is higher than the supply voltage because of the drop through resistor 110. The output of AND gate 35 is applied to the base 83 of transistor 82 through a network comprised of resistors 79 and 80 and capacitor 78. A bias supply for the emitter 85 of transistor 82 is supplied through resistor 87 and zener diode 88 connected between a negative supply voltage and ground. When transistor 69 is biased off transistor 82 is biased to conduction. With transistor 82 conducting, the voltage at the collector 84 is higher than the supply voltage because of the voltage drop through resistor 86. This output voltage is applied to transistor 106 through diode 101. Since the voltage applied from AND gate 34 is less than the voltage applied from the collector 84 of transistor 82 diode 101 is biased so that it is non-conducting.

When three of the registers of counter 3 are in the 1 state transistor 92 is biased so that it will conduct and the voltage at the collector 94 rises due to the voltage drop through resistor 97. This voltage, applied to the base of transistor 107, is no longer sufficient to bias this transistor to conduction so that the transistor is cut off and the voltage appearing at the collector 108 and terminal 114 decreases.

When four of the registers of counter 3 are in the 1 state transistor 69 of AND gate 35 conducts causing the voltage appearing at collector 71 to rise. The voltage applied from collector 71 to the base 83 of transistor 82 is no longer sufficient to bias this transistor to conduction so that the voltage at the collector 84 decreases. This decrease in voltage is applied through diode 101 to the base 107 of transistor 106 where it biases transistor 106 to conduction. With transistor 106 again conducting the voltage appearing at the collector 108 and terminal 114 rises. Thus the output voltage at terminal 114 will be equal to the supply voltage when three and only three of the registers of counter 3 are in the 1 state. This negative voltage is the output signal developed by AND gate 33 of FIG. 1 and applied to bistable multivibrator 19 to cause this multivibrator to assume its second stable state.

The system thus described will select all the combinations of three tones from a group of nine tones. It can be seen that the number of tones selected is not limited to three and that the number of tones from which the selection is to be made is not limited to nine but can be any number greater or less than this. It can also be seen that the selection is not limited to tones but that the system can be used to select any desired elements. Thus a system has been shown which can select all the possible combinations of N elements from a group of M elements in which N and M are integers and M is greater than N.

We claim:

1. A system for selecting all of the different combinations of N elements from a group of M elements where N and M are integers and M is greater than N, such system including in combination, binary counter means having M registers, each of said registers being capable of assuming a 0 or 1 state, means for generating clock pulses coupled to said counter means for causing the same to assume all of its possible states from 0 to $2^M-1$, means coupled to each of said registers and responsive thereto to generate a control signal when N and only N of said registers are in a 1 state, said clock means being coupled to said control signal generating means and being responsive thereto to cause said clock pulses to be inhibited when said control signal is present whereby said counter means remains in its existing state.

2. A system for selecting different combinations of N elements from a group of M elements where N and M are integers and M is greater than N, such system including in combination, binary counter means having M registers, each of said registers being capable of assuming a 0 or 1 state, means for generating clock pulses coupled to said counter means for causing the same to assume in sequence different states from 0 to a number less than $2^M-1$, first and second logic circuit gate means coupled to each of said registers and responsive thereto, said first logic circuit gate means generating a first output signal when $N+1$ or more of said registers are in a 1 state, said second logic circuit gate means generating a second output signal when N or more of said registers are in a 1 state, control means coupled to said first and second logic circuit gate means and said clock means, said control means being responsive to said first and second output signals to cause said clock pulses to be inhibited when said second output signal is present and said first output signal is not present whereby said counter means remains in its existing state.

3. A system for selecting all the combinations of N elements from a group of M elements where N and M are integers and M is at least three times as great as N, such system including in combination, binary counter means having M registers, each of said registers being capable of assuming a 0 or 1 state, means for generating clock pulses coupled to said counter means for causing the same to assume all of its possible states from 0 to $2^M-1$, first and second logic circuit gate means coupled to each of said registers and responsive thereto, said first logic circuit gate means generating a first output signal when $N+1$ or more of said registers are in a 1 state, said second logic circuit gate means generating a second output signal when N or more of said registers are in a 1 state, control means coupled to said first and second logic circuit gate means and said clock means, said control means being responsive to said first and second output signals to cause said clock pulses to be inhibited when said second output signal is present and said first output signal is not present whereby said counter means remains in its existing state.

4. A system for selecting all the combinations of N different elements from a group of M elements where N and M are integers and M is greater than N, such system including in combination, binary counter means having M registers, each of said registers being capable of assuming a 0 or 1 state, means for generating clock pulses, first AND gate means coupling said clock means to said counter means for causing the same to assume all of its possible states from 0 to $2^M-1$, first and second logic circuit gate means coupled to each of said registers and responsive thereto, said first logic circuit gate means generating a first output signal when $N+1$ or more of said registers are in a 1 state, said second logic circuit gate means generating a second output signal when N or more of said registers are in a 1 state, second AND gate means coupled to said first and second logic circuit gate means and responsive to said first and second output signals to develop a control signal when said second output signal is present and said first output signal is not present, said first AND gate means being coupled to said second AND gate means and being responsive to said control signal whereby said clock pulses are inhibited when said control signal is present.

5. A system for selecting all of the different combinations of N elements from a group of M elements where N and M are integers and M is greater than N, such system including in combination, binary counter means having M registers, each of said registers being capable of assuming a 0 or 1 state, first means for generating clock pulses, first AND gate means coupling said first clock means to said binary counter means, bistable multivibrator means having a first and second stable state, the output of said multivibrator in said first stable state being coupled to said first AND gate means whereby said first clock pulses cause said binary counter to assume all of its possible states from 0 to $2^M-1$, first and second logic circuit gate means coupled to each of said registers and responsive thereto, said first logic circuit gate means generating a first output signal when $N+1$ or more of said registers are in a 1 state, said second logic circuit gate means generating a second output signal when N or more of said registers are in a 1 state, second AND gate means coupled to said first and second logic circuit gate means and responsive to said first and second output signals to generate a control signal when said second output signal is present and said first output signal is not present, means coupling said second AND gate to said multivibrator means, said multivibrator means being responsive to said control signal to cause the same to assume its second stable state, ring counter means, third AND gate means, and second means for generating clock pulses, said third AND gate means being responsive to the output of said multivibrator in said second stable state to couple said second clock pulses to said ring counter to cause the same to assume in succession all of its states, means coupling said ring counter to said multivibrator to cause the same to assume its first stable state when said ring counter has returned to its starting condition.

6. A system for selecting combinations of N different tones from a group of M different tones where N and M are integers and M is greater than N, such system including in combination, binary counter means having M registers, each of said registers being capable of assuming a 0 or 1 state, means for generating clock pulses coupled to said counter means for causing the same to assume in sequence different states from 0 to a number less than $2^M-1$, first and second logic circuit gate means coupled to each of said registers and responsive thereto, said first logic circuit gate means generating a first output signal when $N+1$ or more of said registers are in a 1 state, said second logic circuit gate means generating a second output signal when N or more of said registers are in a 1 state, control means coupled to said first and second logic circuit gate means and said clock means, said control means being responsive to said first and second output signals to cause said clock pulse to be inhibited when said second output signal is present and said first output signal is not present whereby said counter means remains in its existing state, M tone generators, tone selection means coupled to said M tone generators and said counter means whereby each of said registers is individually coupled to a separate tone generator and each register which is in a predetermined state selectes a tone to form the combination of N tones.

7. A system for selecting all of the different combinations of N tones from a group of M tones where N and M are integers and M is greater than N, such system including in combination, binary counter means having M registers, each of said registers being capable of assuming a 0 or 1 state, first means for generating clock pulses, first AND gate means coupling said clock means to said binary counter means, bistable multivibrator means having first and second stable states, the output of said multivibrator in said first stable state being coupled to said first AND gate means whereby said first clock pulses cause said binary counter to assume all of its possible states from zero to $2^M-1$, first and second logic circuit gate means coupled to each of said registers and responsive thereto, said first logic circuit gate means generating a first output signal when $N+1$ or more of said registers are in a 1 state, said second logic circuit gate means generating a second output signal when N or more of said registers are in a 1 state, second AND gate means coupled to said first and second logic circuit gate means and responsive to said first and second output signals to generate a first control signal when said second output signal is present and said first output signal is not present, said multivibrator means being coupled to said second AND gate and being responsive to said control signal to cause the same to assume its second stable state, ring counter means, third AND gate means, and second means for generating clock pulses, said third AND gate means being responsive to the output of said multivibrator in said second stable state whereby said second clock pulses are applied to said ring counter to cause the same to assume in succession all of its states, means coupling said ring counter to said multivibrator to cause the same to assume its first stable state when said ring counter has returned to its starting position, M tone generators, tone selection means coupled to said tone generators, said ring counter and said binary counter, whereby each of said registers is individually coupled to a separate tone generator and each register of said binary counter which is in a predetermined state selects a tone to form the combination of N tones, said selection means being responsive to said ring counter whereby said selection of N tones is made when said ring counter applies a signal to said selection means, whereby said combination of N tones is selected for a predetermined period of time.

No references cited.

NEIL C. READ, *Primary Examiner.*